(12) United States Patent
Han (10) Patent No.: US 7,657,732 B2
(45) Date of Patent: Feb. 2, 2010

(54) APPARATUS AND METHOD FOR SECURELY AND CONVENIENTLY REBOOTING A COMPUTER SYSTEM

(75) Inventor: Kyu-in Han, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 952 days.

(21) Appl. No.: 11/165,243

(22) Filed: Jun. 24, 2005

(65) Prior Publication Data

US 2005/0289357 A1 Dec. 29, 2005

(30) Foreign Application Priority Data

Jun. 25, 2004 (KR) ............ 10-2004-0048281

(51) Int. Cl.
*H04L 29/06* (2006.01)
*G06F 9/00* (2006.01)
(52) U.S. Cl. .................................. 713/2; 713/164
(58) Field of Classification Search ............ 713/164
See application file for complete search history.

(56) References Cited

U.S. PATENT DOCUMENTS

| 5,276,863 A * | 1/1994 | Heider .................... 709/222 |
| 5,363,446 A | 11/1994 | Ruppertz et al. |
| 6,370,650 B1 | 4/2002 | Cromer et al. |
| 6,460,139 B1 * | 10/2002 | Heinrich et al. ............ 726/17 |
| 7,007,300 B1 * | 2/2006 | Weber et al. ............... 726/21 |
| 7,360,073 B1 * | 4/2008 | Billstrom et al. ............ 713/2 |
| 2003/0074590 A1 * | 4/2003 | Fogle et al. ................ 713/320 |
| 2005/0182944 A1 * | 8/2005 | Wagner et al. ............. 713/182 |

FOREIGN PATENT DOCUMENTS

| JP | 8-263163 | 10/1996 |
| KR | 1998-050674 | 9/1998 |

OTHER PUBLICATIONS

Notice of Examination Report issued by the Korean International Patent Office on Nov. 29, 2005 with English translation.

* cited by examiner

*Primary Examiner*—Matthew B Smithers
(74) *Attorney, Agent, or Firm*—Staas & Halsey LLP (57) ABSTRACT

Provided are a method and an apparatus for rebooting a computer system taking both security and user convenience into account. The computer system includes an authentication mode information storage unit storing authentication mode information related to an authentication mode when booting the computer system, a first driver sensing rebooting of the computer system and setting an authentication mode of the authentication mode information, and a second driver, which reads the authentication mode information and if the authentication mode is a first mode, performs rebooting without user authentication and if the authentication mode is a second mode, performs rebooting after user authentication.

27 Claims, 5 Drawing Sheets

```
#include <stdio.h>
include <dos.h> define REBOOT_SET       1
define NOREBOOT         2
#define REBOOT_SUCCESS   100
define REBOOT_FAIL      -1 main( )
{
    int boot_flag = NOREBOOT;

/* PERFORM INITIAL POST */
    DoingPOST();

/* THE CASE WHERE AUTHENTICATION MODE INFORMATION IS STORED IN ADDRESS 0xAC */
    outportb ( 0x70, 0xAC ) ;                                               ─── S1312
    boot_flag = inportb ( 0x71 ) ;

if (boot_flag != REBOOT_SET )
    {
        Check_PASSWORD();           /* CHECK BIOS PASSWORD */                ─── S1314
    }
    else
    {
        outportb ( 0x70, 0xAC ) ;   /* UPDATE AUTHENTICATION MODE INFORMATION IN ADDRESS 0xAC */
        outportb ( 0x70, REBOOT_SUCCESS);                                    ─── S1316
    }

/* PERFORM BOOTING */
}
```

APPARATUS AND METHOD FOR SECURELY AND CONVENIENTLY REBOOTING A COMPUTER SYSTEM

CROSS-REFERENCE TO RELATED APPLICATION

This application claims priority from Korean Patent Application No. 10-2004-0048281 filed on Jun. 25, 2004 in the Korean Intellectual Property Office, the disclosure of which is incorporated herein by reference in its entirety.

COPYRIGHT NOTICE/PERMISSION

A portion of the disclosure of this patent document contains material which is subject to copyright protection. The copyright owner has no objection to the facsimile reproduction by anyone of the patent document or the patent disclosures, as it appears in the Patent and Trademark Office patent file or records, but otherwise reserves all copyright rights whatsoever.

BACKGROUND OF THE INVENTION

1. Field of the Invention

An embodiment of the present invention relates to a computer system, and more particularly, to a method and an apparatus for improving user convenience and security by selectively performing user authentication when rebooting.

2. Description of the Related Art

Computer systems provide a variety of functions to many segments of today's modern society. A computer system may be a desktop or portable computer that consists of a system unit comprising a processor, associated volatile and nonvolatile memory, a display monitor, a keyboard, one or more diskette drives, fixed disk storage, and an optional printer. As computer systems are widely used in offices as well as at home, security of computer systems has become an important issue. Primary security of data inside a computer system relies on a basic input/output system (BIOS) password and an operating system (OS) password, which are prompted for when a computer system is booted.

Booting is a series of procedures required before a computer becomes operable. When a power switch of a computer is turned on for booting, a basic program called a ROM BIOS operates first. The program is recorded in a nonvolatile memory called a read only memory (ROM), which cannot be erased or lost even when the power is turned off. In the case of a booting operation of an IBM PC compatible computer, an inspection called a power on self test (POST) is performed first. Although the POST is performed in slightly different ways according to the contents of the ROM BIOS, an error message with an alarm is displayed on a monitor and booting stops if RAM used as main memory, a keyboard, or a hard disc are found to have any problems.

When the POST is completed, the operating system (OS) of a computer system is read and made resident in memory. A user refers to the ROM BIOS in order to obtain information about which drive the operating system (OS) is to be read from. The above-described booting procedure is usually referred to as cold booting. On the other hand, warm booting is a procedure in which the POST is not performed during booting. The computer system finishes the booting operation successfully before the user may perform a desired task.

Rebooting is a procedure in which a booting operation is performed to start the operating system (OS) again if an error occurs when, for example, a computer is running or information about the settings of a computer system is changed and the operating system should be run again or volatile information throughout the entire system is removed. Rebooting usually takes the form of warm rebooting, in which the POST is not performed thereby shortening the booting procedure.

The BIOS that performs booting is a kind of program run by a microprocessor when a computer system is turned on. The BIOS also manages data flow between peripheral devices such as hard disks, video adaptors, keyboards or mice etc. and the operating system (OS). The BIOS is stored in ROM. Recently, the BIOS has also been stored in changeable ROMs such as erasable programmable read only memories (EPROMs) or electrically erasable programmable read only memories (EEPROMs). A password can be set during BIOS booting so that when another person has access to the computer system, the computer system is prevented from being operated and power can be cut off.

The BIOS reads setting information of the computer system when starting. The setting information is usually changeable and maintainable. Thus, the setting information needs to be stored in nonvolatile and writable memory. In a typical computer system, the setting information of the BIOS is stored in a complementary metal oxide semiconductor (CMOS). Most computer microchips use CMOS type transistors. When the BIOS performs booting using the CMOS, necessary information can be changed.

The setting information related to the execution of the BIOS stored in the nonvolatile memory such as a CMOS includes a BIOS password. With the BIOS password, when user authentication is performed at an initial stage of booting using the BIOS and an error occurs in checking a password, the power of the computer system is cut off to prevent other people from accessing the computer system. The OS starts operating after the BIOS starts running, and user certification or authentication such as the entry of a password can be performed again when the operating system (OS) is first accessed.

The BIOS password and an OS password, when password protection is activated, are required to be input every time when booting. Since many users find this to be inconvenient, they often avoid using a password altogether. In particular, when installing and upgrading software, rebooting frequently occurs so that the entire system can be effectively executed, which in turn requires the frequent entry of a password. This may cause inconvenience to a verified user. In the prior art, a method for deactivating a password requirement utilizing a wireless signal so that the entry of a password can be selectively performed during booting is disclosed in U.S. Pat. No. 6,370,650. However, the wireless signal is applied to all types of booting (cold and warm), and the entry of a password is not deactivated only during rebooting. As a result, it is difficult to maintain security due to the drawback of the wireless signal. In addition, a method of managing a password related to network connection has been proposed but cannot prevent operation of the computer system.

Accordingly, a method by which rebooting can be performed without user authentication is desirable.

SUMMARY OF THE INVENTION

In one aspect, the present invention provides a method and an apparatus for rebooting a computer system in which booting is performed without the need for user authentication during rebooting, so that user convenience is improved.

In another aspect, the present invention provides a method and an apparatus for rebooting a computer system in which a user sets authentication information in the computer system based on the user's convenience, so that security is improved.

According to another aspect of the present invention, there is provided a computer system including an authentication mode information storage unit storing authentication mode information related to an authentication mode when booting the computer system, a first driver sensing rebooting of the computer system and setting the authentication mode of the authentication mode information, and a second driver, which reads the authentication mode information and if the authentication mode is a first mode, performs rebooting without user authentication and if the authentication mode is a second mode, performs rebooting after user authentication.

According to another aspect of the present invention, there is provided a method for rebooting a computer system. The method includes sensing rebooting of the computer system and setting an authentication mode of authentication mode information using a first driver, storing the authentication mode information and rebooting the computer system, and reading the authentication mode information and if the authentication mode is a first mode, performing rebooting without user authentication and if the authentication mode is a second mode, performing rebooting after user authentication using a second driver.

Additional aspects and/or advantages of the invention will be set forth in part in the description which follows and, in part, will be apparent from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 1:
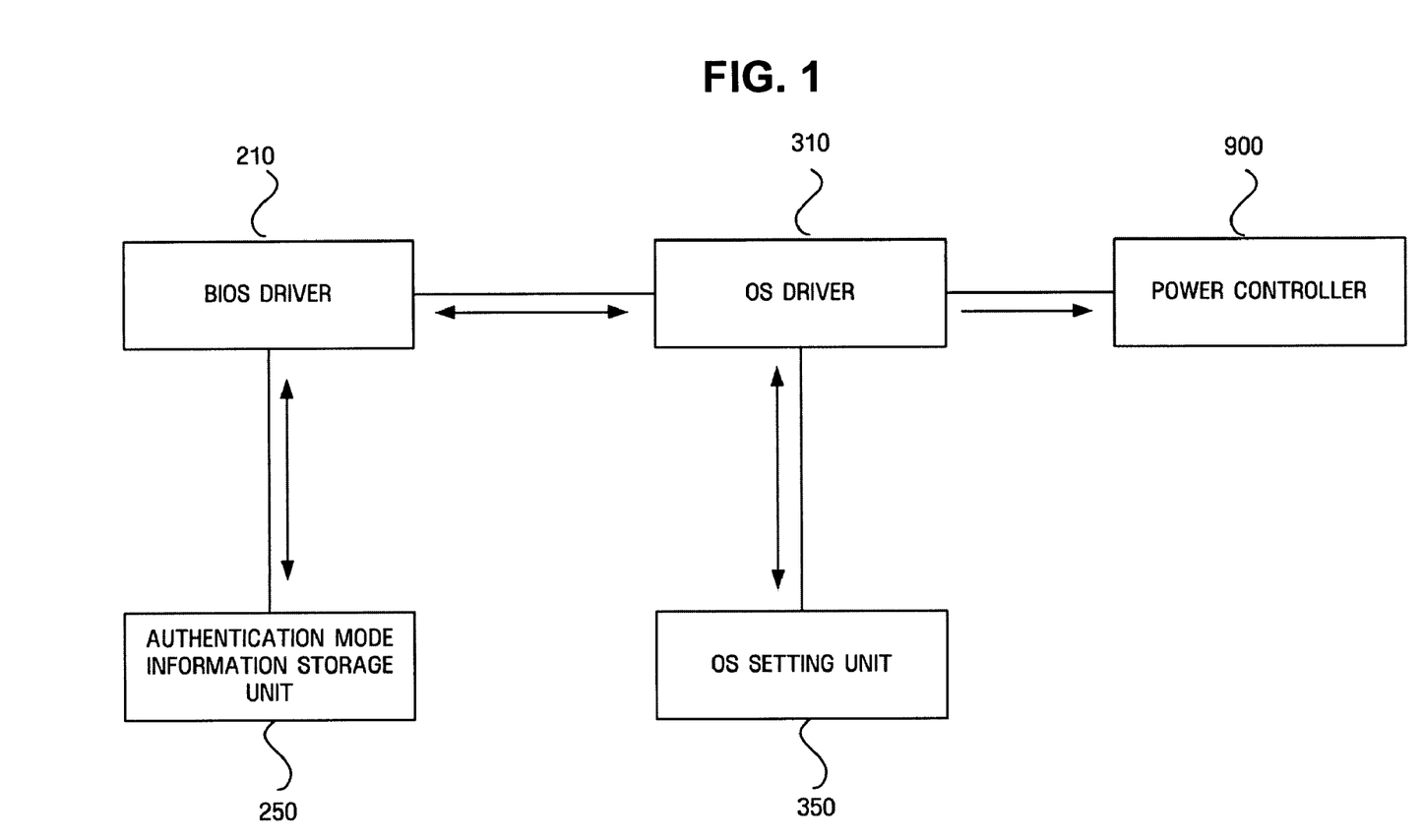
FIG. 1 is a diagram of a structure of an apparatus for rebooting a computer system according to an embodiment of the present invention.

FIG. 1 is a diagram of a structure of an apparatus for rebooting a computer system according to an embodiment of the present invention.

An operating system (OS) driver 310 and a basic input/output system (BIOS) driver 210 according to an embodiment of the present invention will be described. These drivers are applicable with respect to another module that replaces a configuration or function of the operating system (OS) and the BIOS. Thus, a module for setting environment information before rebooting will be referred to as a first driver and a module for reading environment setting information after rebooting will be referred to as a second driver. The OS driver 310 is implemented according to an embodiment of the first driver, and the BIOS driver 210 is implemented according to an embodiment of the second driver. In the future, if the function of the BIOS is replaced or the operating system (OS) and the BIOS are combined with each other, the first driver and the second driver can be integrated into one module and are not limited to software and/or hardware.

The term 'module', as used in an illustrative embodiment, means, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. In addition, the components and modules may be implemented such that they execute one or more computers in a communication system.

A part of the computer system of FIG. 1 includes a BIOS driver 210, an authentication mode information storage unit 250, an OS driver 310, an OS setting unit 350, and a power controller 900.

The authentication mode information storage unit 250 has information required when the BIOS and the operating system (OS) are rebooted. In an embodiment of the present invention, the authentication mode information storage unit 250 may have values corresponding to first and second modes, which indicate whether or not the current booting is a rebooting mode. The authentication mode information storage unit 250 may also include a rebooting result flag which indicates whether rebooting was performed successfully. The authentication mode information storage unit 250 may be implemented with a complementary metal oxide semiconductor (CMOS) or as a nonvolatile (characterized in that recorded contents are maintained even when the power supply is cut off) register, or in a file format in a storage device such as a hard disk. The type of authentication mode information storage unit 250 depends on the implementation and is not limited to the above-described CMOS, register or hard disk etc. The authentication mode information storage unit 250 can be implemented as a readable/writeable storage device. Since most BIOS setting information is stored in the CMOS, the authentication mode related to rebooting and result information may also be stored in the CMOS. Since in most computer systems, the setting information required by the BIOS program takes a portion corresponding to less than half of the entire storage capacity of the CMOS, the authentication mode information can be easily stored in the CMOS.

The authentication mode information indicates to the BIOS (using a flag) whether to perform rebooting or not. The authentication mode information notifies the BIOS that current booting is actually a rebooting mode and that there is no need to check for a BIOS password. The information is also used in running the OS.

The BIOS driver 210 performs an operation related to BIOS booting including an operation of reading and writing the authentication mode information from/into the above-described authentication mode information storage unit 250. The BIOS driver 210 includes nonvolatile memory such as a ROM, containing the BIOS program, and nonvolatile memory such as a CMOS, containing setting information required when the BIOS program is run. The BIOS driver 210 connects the authentication mode information storage unit 250 to the OS driver 310, which will be described later. Basic input/output of the computer system is performed by the BIOS. When the authentication mode information storage unit 250 is implemented as a CMOS, a register, a file system, etc., the OS driver 310 can use a function provided by the BIOS so as to write or read information into/from the authentication mode information storage unit 250.

The OS driver 310 executes the OS so that the OS can reside in memory, changes setting information of the OS for rebooting, and performs a setting operation related to rebooting using the BIOS. The OS driver 310 is implemented differently according to each OS. In an embodiment of the present invention, the OS driver 310 is based on a version of the Microsoft Windows Operating System. However, the OS driver 310 could alternatively be based on another OS such as Unix.

The OS driver 310 may be implemented in various ways. That is, in Windows, a Windows driver may be used. A driver is a kind of program which interacts with a specific device or a special kind of software. When a new printer, display monitor, etc. has been purchased, the user should install a driver related thereto. The driver includes additional information about the device or a specific software interface, and the driver in most personal computers (PCs) is a DLL file. In an embodiment of the present invention, the driver is one example of the OS driver 310. The OS driver 310 controls rebooting of Windows and can control how each of the components of FIG. 1 operates during rebooting to perform an operation of temporarily deactivating the entry of a password before and after rebooting. However, once rebooting is completed, a password should be checked. Thus, it is necessary to perform an operation of restoring the system into the original state. If the operation is completed, the OS driver 310 requests the power controller 900 to reset the power.

The OS setting unit 350 stores information about an environment or characteristics in which the OS driver 310 runs the OS. The authentication mode information storage unit 250 stores information which notifies the BIOS driver 210 and the OS driver 310 whether or not the current booting mode is a rebooting mode. On the other hand, the OS setting unit 350 stores setting information required so that, when rebooting is performed according to the information, user authentication is not performed when the OS is run. Thus, the OS setting unit 350 stores information related to user authentication by the OS. By changing the information of the OS setting unit 350, the OS starts operating and a change occurs during operations. In an embodiment of the present invention, the OS setting unit 350 runs the OS without checking an OS password and may be implemented differently according to each OS. The OS setting unit 350 may be a registry in Windows. The registry has detailed setting information about an OS. For example, the detailed setting information also includes information related to user authentication such as a password used during user authentication or information about whether user authentication is to be performed. In an embodiment of the present invention, changed information of the OS setting unit 350 includes information related to user authentication in which the OS operates without the need for entering a password.

The power controller 900 supplies power to the computer system. During rebooting, the power controller 900 resets power in response to a reset request transmitted by the OS driver 310 or a component of another system.

Figure 2:
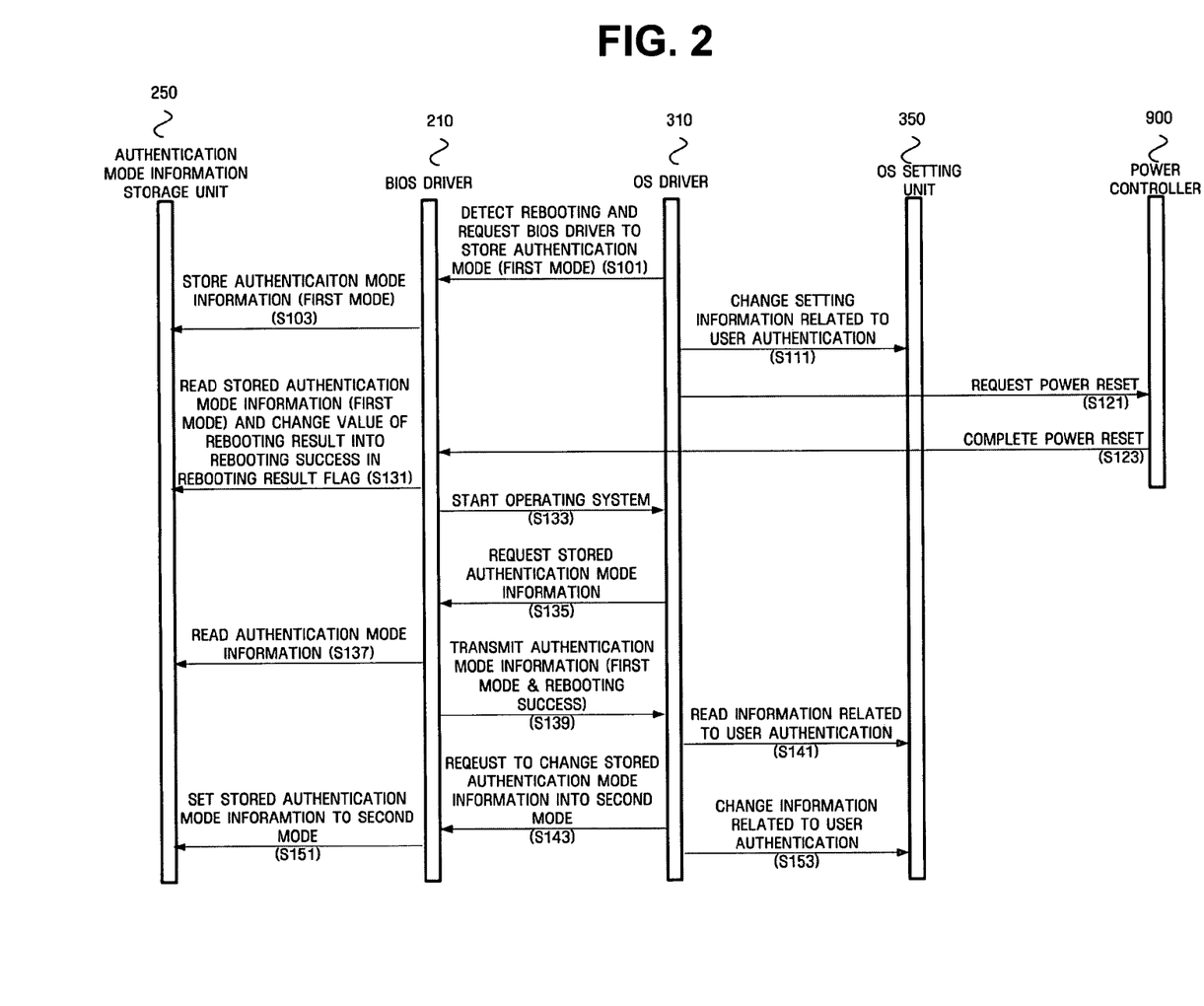
FIG. 2 is a diagram illustrating how each of the components of the computer system shown in FIG. 1 operates during rebooting according to another embodiment of the present invention.

FIG. 2 illustrates how each of the components of FIG. 1 operates during rebooting. Specifically, FIG. 2 illustrates a procedure according to an embodiment of the present invention, in which a password is not checked when the computer system is rebooted. The procedure will be described based on a computer system running a Windows OS and in which authentication mode information is stored in a CMOS. Such authentication mode information and OS may differ according to the kind of OS installed on the computer system. The authentication mode information stored in the CMOS may include an authentication mode indicating a first or second mode and a result flag indicating the result of rebooting. These two pieces of information may be independent from each other or may exist as combined information.

When rebooting is performed, in operation S101, the OS driver 310 requests the BIOS driver 210 to store authentication mode information in the CMOS. Setting information for driving the BIOS is stored in the CMOS, and a spare storage space exists in the CMOS. Thus, the authentication mode information may be stored in the spare storage space of the CMOS. In operation S103, the BIOS driver 210 requested by the OS driver 310 to store the authentication mode information stores a value indicating that rebooting is performed in a predetermined address (memory position) of the CMOS 250.

The authentication mode information of the CMOS used in FIG. 2 may include the following constants for convenience of explanation. The values can be varied by the BIOS driver and the OS driver.

| | |
|---|---:|
| #define REBOOT_SET | 1 |
| #define NOREBOOT | 2 |
| #define REBOOT_SUCCESS | 100 |
| #define REBOOT_FAIL | −1 |

The authentication mode is largely classified into a first mode and a second mode. This can be determined by REBOOT_SET and NOREBOOT. The first mode is a mode in which rebooting is performed without the need of user authentication, and the second mode is a mode in which booting is performed without deactivating user authentication.

There may be a rebooting result flag for indicating the result of rebooting in the first mode. The rebooting result flag has two values, that is, rebooting success and rebooting failure. This can be represented as REBOOT_SUCCESS and REBOOT_FAIL in the declaration. In the first mode, combination of success and failure is possible. By placing one flag in the first mode, as booting is performed, the value of the rebooting result in REBOOT_SET may change into REBOOT_SUCCESS and REBOOT_FAIL. The value of the rebooting result is a value referred to when booting is performed by the OS driver 310.

Based on the declaration example, in operation S103, REBOOT_SET, that is, a value of 1, is stored in a predetermined address (memory position) of the CMOS 250, and even though power is cut off due to characteristics of the CMOS, the value of 1 is maintained. In the case of REBOOT_SET, the computer system can be set in the first mode in which user authentication is deactivated, regardless of user authentication information, for example, regardless of whether the BIOS password is set. There may be two cases in NOREBOOT. When the BIOS password is set in set-up information of the BIOS, user authentication is performed. When the BIOS password is not set, the computer system can be booted without the need for user authentication. In the second mode, user authentication is performed. However, user authentication is not performed in the case where the BIOS password is not set in the set-up information of the BIOS self. Whether user authentication is performed in the second mode depends on whether a password exists in the set-up information of the BIOS. In an embodiment of the present invention, it is assumed that user authentication is set in the BIOS set-up. Thus, in the second mode, user authentication is performed.

After the OS driver 310 requests the BIOS driver 210 to store the authentication mode information in the CMOS, it changes the information related to user authentication of the OS setting unit 350. As an example of the changing information, the information is set so that the user logs in automatically without a password being checked. In the case of Windows, the information is stored in the registry. The registry is a place in which, in an operating system such as Windows 95, Windows 98, or Windows NT, information required in booting, that is, information about which hardware is installed, what the specifications or options of the system are, how memory is to be set, etc. The registry is similar to the environment setting file (.ini file) used in a previous Windows system, that is, Windows 3.1 and a user can understand that the registry is substituted for the environment setting file. However, the environment setting file may still be provided for compatibility with 16-bit applications operated by the previous Windows system. Information for determining whether a password is required when a user logs in is also included in the registry. In the case of Windows 98, in order to execute log-in without checking a password, the value of AutoAdminLogon can be changed. The value of AutoAdminLogon is set to 1 in HKEY_LOCAL_MACHINE\SOFTWARE\Microsoft\Windows\CurrentVersion\Winlogon.

In the case of XP as another Windows OS, in HKEY_LOCAL_MACHINE\SOFTWARE\Microsoft\Windows\CurrentVersion\Winlogon, the value of AutoAdminLogon may be set to 1 and DefaultPassword may be blank. The value of DefaultPassword that has been blank needs to be stored in a file etc. and restored after booting. Information about items of the registry are examples of setting information. This can be implemented in a way different from the registry according to Windows. In addition, detailed information about the item may change according to each Windows OS.

The precise setting depends on which version of Windows is installed on the system but the method of storing information in a registry is similar. When the item of the registry is changed to 1 or the password is made blank, Windows starts operating automatically without checking a password. When the operation is performed, in order to restore the item into an original value after rebooting, the information about user authentication can be stored in a file, etc.

If the operation is completed, in operation S121, the OS driver 310 requests the power controller 900 to reset power. In response, the power controller 900 resets the power and then communicates the result of resetting to the BIOS driver 250 in operation S123. This is because, after power is reset, a BIOS program of the BIOS driver 250 starts being executed first. The BIOS driver 250 executes the BIOS program. In operation S131, the BIOS program reads a specific address of the CMOS in which the authentication mode information is stored, before checking the BIOS password during booting according to an embodiment of the present invention. When a value stored in the specific address of the CMOS is a value corresponding to a first mode indicating whether or not rebooting is performed, for example, when REBOOT_SET is stored in the specific address of the CMOS, the entry of a password is deactivated and the BIOS operation is performed. In operation S131, after the specific address of the CMOS has been read, a value indicating that reading of the specific address of the CMOS is completed is set so that the OS driver 310 knows that rebooting is completed. The set value corresponds to an authentication mode and a rebooting result. Based on the previous declaration example, the authentication mode is the first mode, and the value of the rebooting result may be set to REBOOT_SUCCESS. The value is information read when the OS driver 310 runs the OS.

If rebooting is completed in the BIOS operation, in operation S133, the OS starts operating. The OS driver 310, resident in memory when the OS starts operating, requests from the BIOS driver 250 authentication mode information in the CMOS, so as to check whether the OS is run by rebooting or whether rebooting is properly performed. The BIOS driver 250 reads the user authentication information stored in the specific address of the CMOS in operation S137 and transmits the read information to the OS driver 310 in operation S139. As shown in the previous example, the transmitted value is NOREBOOT if just a booting is performed, and if rebooting is successfully performed, the transmitted value will be REBOOT_SUCCESS. If any problem occurs in rebooting, the value will be REBOOT_FAIL.

In operation S141, the OS driver 310 that receives information about booting from the BIOS driver 210 reads predetermined information related to user authentication of the OS setting unit 350 and runs the OS if it receives the transmitted value REBOOT_SUCCESS indicating rebooting was successfully performed. This is because, since the entry of a password is deactivated in operation S111, the OS is run without the need of user authentication (without the entry of a password). Since the authentication mode information (first mode) stored in the CMOS is not needed after the operation is completed, the user requests the BIOS driver 210 to change the first mode into the second mode in operation S143. The BIOS driver 210 sets the CMOS authentication mode information to the default value of NOREBOOT in operation S151. While the operation is being performed, the OS driver 310 reads the information related to user authentication before setting a value for rebooting from a previously-stored file, etc., changes the information related to user authentication of the OS setting unit 350, and undergoes user authentication (checking a password) during booting in operation S153.

When Unix is used as an operating system in the embodiments shown in FIGS. 1 and 2, the operating system (OS) may be implemented according to the characteristics of Unix. The OS driver 310 and the OS setting unit 350 are not limited to Windows operating systems and are also applicable to other operating systems such as Unix. Unix is an operating system that originated at Bell Labs in 1969 as an interactive time-sharing system. A combination of the C language and shell (user command) interfaces from different versions of Unix were standardized under the auspices of the IEEE as the Portable Operating System Interface (POSIX). In turn, the POSIX interface was specified in the X/Open Programming Guide 4.2. This interface is also known as the "Single Unix Specification" and "Unix 95"). Version 2 of the Single Unix Specification is also known as Unix 98. The trademark "Unix" is now owned by the Open Group, an industry standards organization, which certifies and brands Unix implementations. Unix operating systems are used in widely-sold workstation products from Sun Microsystems, Silicon Graphics, IBM, and a number of other companies. The Unix environment and the client/server program model were important elements in the development of the Internet and the reshaping of computing as centered in networks rather than in individual computers. Linux, a Unix derivative available in both free and commercial form, is increasing in popularity as an alternative to proprietary operating systems.

Unix is booted in steps, such as a boot programmable read-only memory (PROM) step, a kernel initialization step, and a step /sbin/init. In a boot PROM step, a system confirmation banner is displayed and self diagnosis is performed. The self diagnosis is similar to the above-described POST. Then, a boot device defined in the boot PROM is searched and a boot program is installed from the boot device. Once the boot program is installed, an operating system is then booted. In a kernel initialization step, a kernel performs initialization on itself and a module is installed using a program /ufsboot. In the step /sbin/init, an initialization (init) program of the kernel is executed, and the initialization (init) program determines a proper run level and executes /etc/rc by referring to /etc/inittab. The position of the directory may vary according to the settings and characteristics of Unix. Thus, the OS driver 310 to be implemented in an embodiment of the present invention may be connected to the program /ufsboot or also participate in execution of the initialization (init) program of the kernel. Linux, which has a similar structure to Unix, also performs booting based on the above-described method.

A run level allows Unix to be run at various run levels according to the state of the system. Redhat Linux 6.0 has the following run levels.

0—abort
1—single user mode
2—multiuser mode without networking function
3—full multiuser mode
4—unused
5—execute X11 (X11 is a graphic environment based on Windows)
6—rebooting mode When a rebooting mode (run level 6) is used, booting is possible without checking a password in an embodiment of the present invention. In addition, in the case of Unix, setting information can be changed so that a password is not checked. For example, the user may insert NO into a field PASSWORDREQ from a file /etc/default/login or delete a password from user account information included in a file /etc/default/passwd, stores the password in another file and then restore it after booting. Since Unix stores setting information in a specific Unix file system such as /etc/default, the OS setting unit 350 in Unix system may use this file. Thus, in the case of Unix, the OS driver 310 sets REBOOT_SET in a specific position of a CMOS, register or hard disk when storing user authentication information and performs booting in a rebooting mode (run level is set to the rebooting mode). When rebooting, the BIOS driver 210 reads the set-up information, deactivates the entry of a BIOS password and changes the information. Referring to FIG. 2, after the rebooting result value is changed into REBOOT_SUCCESS, rebooting is completed by the OS driver 310, and the authentication mode is set to NOREBOOT. However, if booting is performed in the rebooting mode, an OS password is not needed when booting the operating system. Thus, the OS driver 310 can set the authentication mode information to NOREBOOT.

If booting cannot be performed in the rebooting mode, the authentication mode information is processed in a different way. That is, similar to a method of changing a registry in the Windows OS, Unix can change setting information read when booting. As a setting file, /etc/default/login is generally used, and booting can be performed without checking a password by changing information in the PASSWORDREQ field in the file. Since the file should be restored after rebooting, the file is copied before changing the file /etc/default/login, the information in the PASSWORDREQ field is changed and rebooting is performed, and then, the file that has been previously copied can be copied to the original file /etc/default/login. The position or name of the file may vary according to the Unix system used by a corresponding computer system, or according to the settings.

Figure 3:
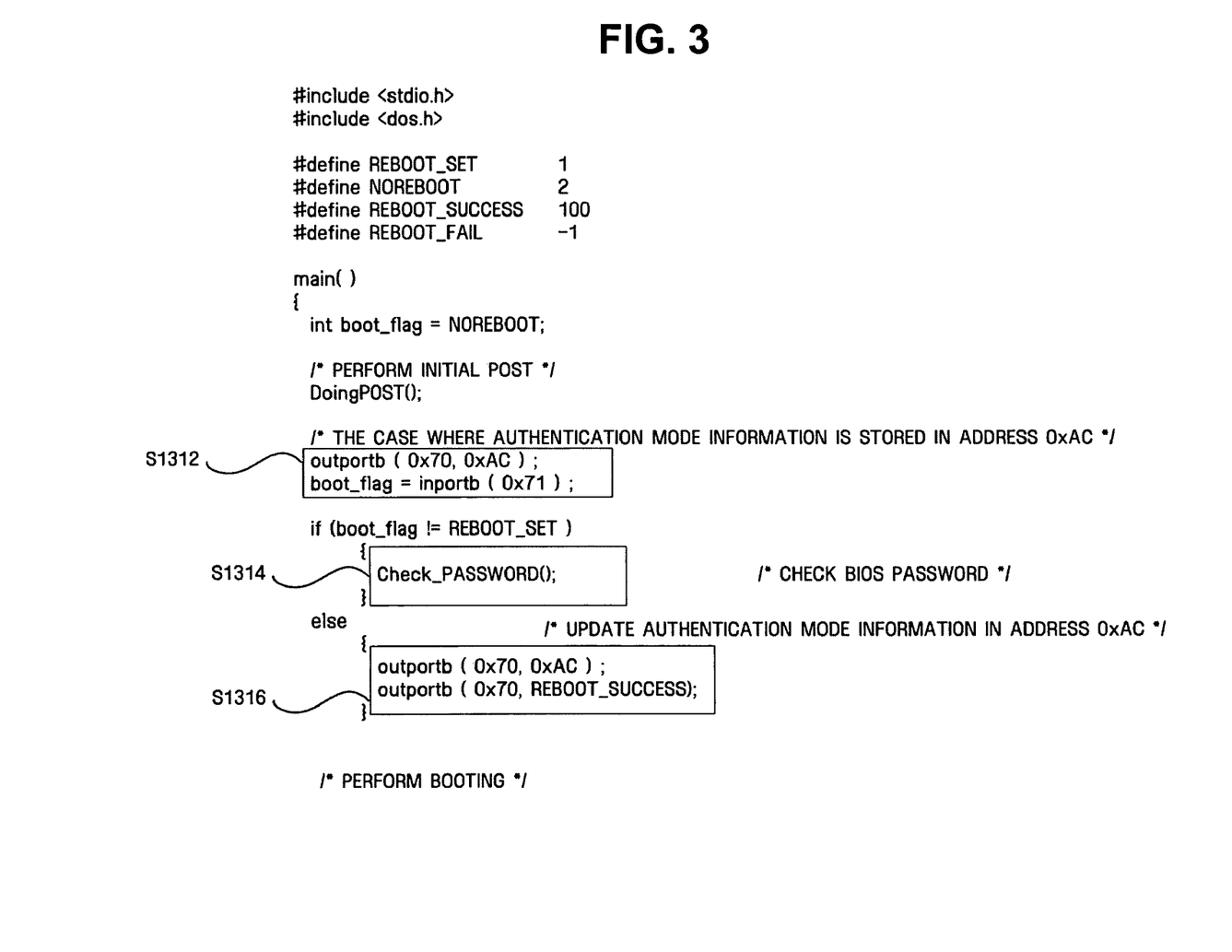
FIG. 3 is an example of a program for performing operation S131 shown in FIG. 2, illustrating a rebooting procedure according to another embodiment of the present invention.

In order to deactivate the entry of a BIOS password in operation S131 of FIG. 2, a part of the BIOS program should be changed. An example program for deactivating the entry of a password when the BIOS program is written in the C language is shown in FIG. 3. FIG. 3 is an example program for performing operation S131 of FIG. 2 illustrating a rebooting procedure according to an embodiment of the present invention. That is, FIG. 3 illustrates the case where authentication mode information is stored in an address 0xAC in the CMOS. In operation S1312, POST is undergone and the authentication mode information is read from 0xAC. The value is stored in a variable boot_flag, and an authentication mode and the result of rebooting are indicated as one variable. The user determination of password checking is made according to a value of boot_flag. If the value is not REBOOT_SET, which means that rebooting is not performed or an error has occurred in past rebooting, then, a function Check_PASSWORD( ) is executed in operation S1314. The function performs checking of a password. If the value of boot_flag is REBOOT_SET, in operation S1316, a password check function is not executed but REBOOT_SUCCESS is stored in 0xAC so as to indicate that the OS driver 31 is rebooted. After that, a booting procedure is continuously performed. The use of the CMOS is just an embodiment of the present invention and the authentication mode may be stored in a file format in a predetermined position of a hard disk or using a nonvolatile register or memory other than a CMOS. This embodiment has been described based on CMOS for convenience of explanation since the BIOS reads the value stored in the CMOS, and a method of storing and reading information in other devices is similar to the CMOS.

Figure 4:
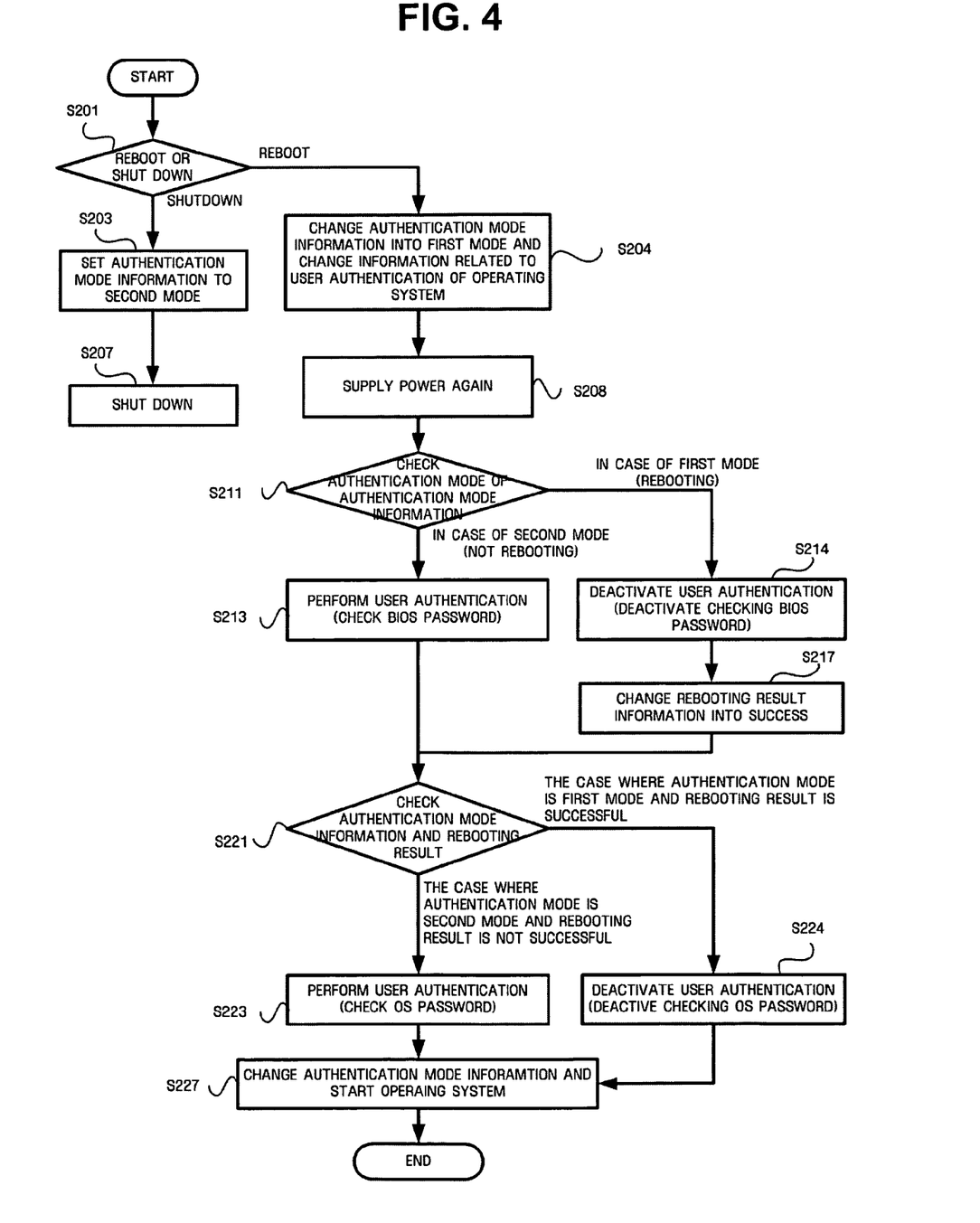
FIG. 4 is a flowchart illustrating an operation of rebooting the computer system according to another embodiment of the present invention.

FIG. 4 is a flowchart illustrating an operation of rebooting the computer system according to another embodiment of the present invention. In operation S201, the user checks whether the computer system is to be rebooted before being turned off or is to be completely turned off. If the computer system is to be turned off (shutdown), in operation S203, authentication mode information is set to a second mode, and in operation S207, the computer system is turned off after notifying the computer system of no further rebooting. If rebooting is determined in operation S201, the authentication mode information is set to a first mode and the same information related to user authentication as a password setting portion of an operating system is changed in operation S204. The setting portion may vary according to an operating system as previously described. Then, power is again supplied to the computer system in operation S208 and the system is run, BIOS checks the authentication mode in operation S211. If the booting is not rebooting (second mode), as a user authentication procedure, a BIOS password is checked in operation S213. However, if the booting is rebooting (first mode), the BIOS password is not checked in operation S214. In order to indicate whether rebooting is successfully performed to the operating system, a rebooting result value is changed and then booting in the BIOS is completed in operation S217.

If processing in the BIOS is completed, the operating system is run and the authentication mode information is checked in operation S221. If the authentication mode is the second mode (not rebooting), an operating system (OS) password as a user authentication procedure is checked in operation S223. In the case of the first mode (rebooting), the entry of the OS password as the user authentication procedure is not performed in operation S224 and the operating system starts operating. In operation S227, the authentication mode information and the information related to user authentication of the OS setting unit 350 should be changed into setting information used in normal booting so that the user authentication procedure can be performed in the next boot.

Figure 5:
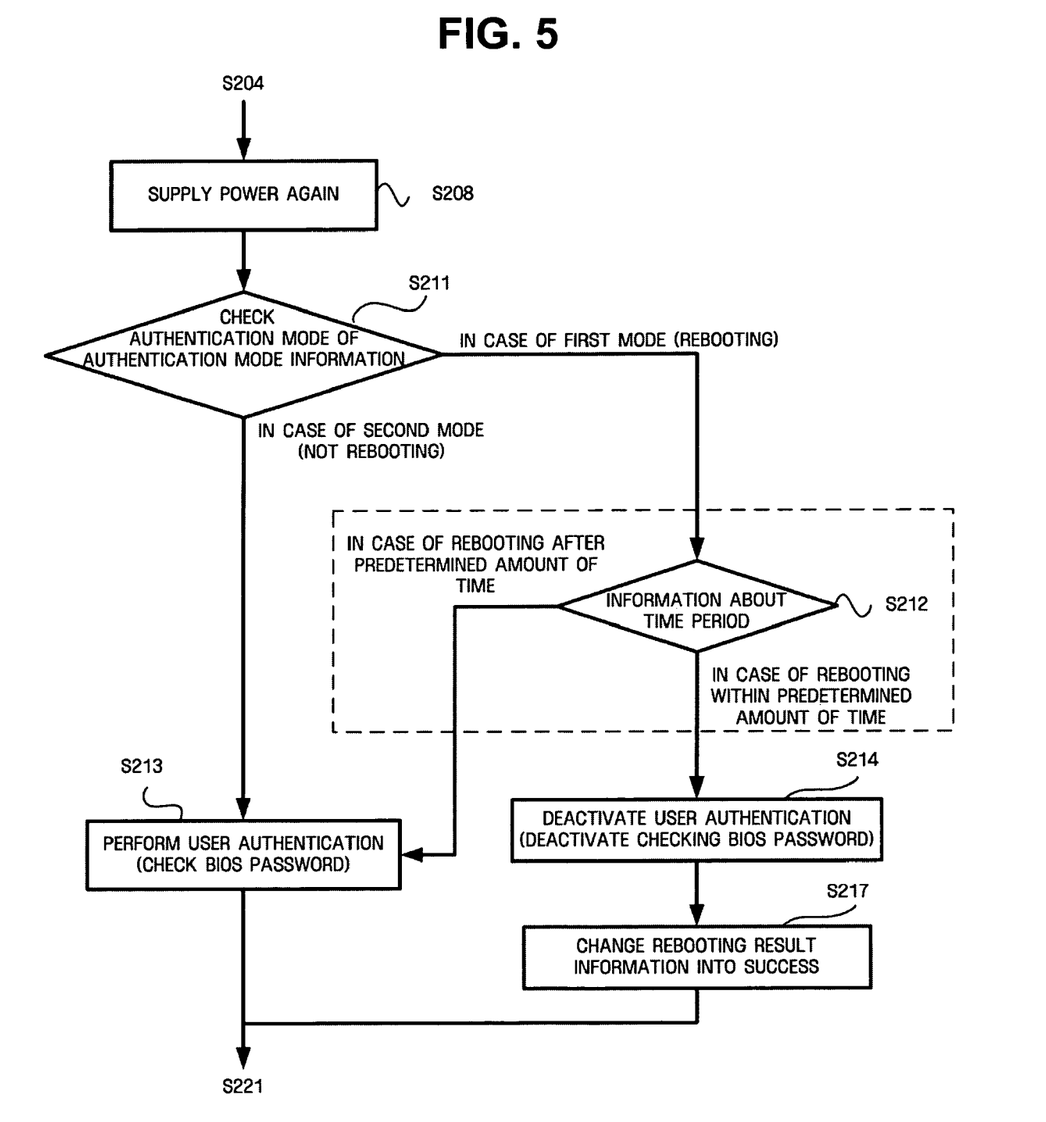
FIG. 5 is a flowchart illustrating an operation of checking information about a time period in which rebooting can be performed, according to another embodiment of the present invention.

The above-described embodiments have shown that rebooting was performed after checking whether or not rebooting is to be performed. FIG. 5 is a flowchart illustrating an operation of checking information about a time period in which rebooting can be performed, when the computer system is rebooted, according to another embodiment of the present invention.

In other words, the case where information about a time at which rebooting can be performed or a time at which authentication mode information is stored is added to authentication mode information will be described with reference to FIG. 5. Setting information before rebooting is the same as FIG. 4 but setting information also includes information about time as well as the above-described rebooting flag. This is because when rebooting is not performed within, for example, 5 minutes, checking of a password as a user authentication procedure is performed when the computer system is booted thereafter. The only difference between FIGS. 4 and 5 is operation S212. In operation S211, authentication mode information is checked. In the case of rebooting, information about a time period or amount of time is checked in operation S212. In the case of rebooting within a predetermined amount of time, checking a BIOS password is deactivated in operation S214. In the case of rebooting after the predetermined amount of time, it is determined that rebooting is not performed and checking of a BIOS password is performed in operation S213. Driving the operating system depends on rebooting setting information that was changed while the BIOS was booting, similar to FIG. 4. By adding the operation, a user authentication procedure must be performed to boot the system after a considerable amount of time has elapsed due to power supply in the course of rebooting.

In the above-described embodiments of the present invention, the authentication mode information is set by a unit for driving the operating system. However, this is not possible only in the unit for driving the operating system. For example, when a power flow of the power controller is sensed and power is instantaneously reset, information about a CMOS or the like is changed, thereby deactivating the checking step of the BIOS password and the operating system password, as described above.

User authentication may be performed in various ways such as fingerprint recognition and speech recognition as well as the entry of a password. The present specification has described by way of example a method of checking a password, which is most widely used in the field of computer technology, however the present invention is not limited to the method of checking a password for user authentication.

According to the present invention, since user authentication is not required when the computer system is rebooted, even though the user has set authentication information, a convenience in which the computer system can be easily rebooted is provided to the user.

In addition, users can set authentication information of the computer system to optimize convenience, thereby improving the security of the computer system.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A computer system comprising:
an authentication mode information storage unit storing authentication mode information related to an authentication mode when booting the computer system;
a first driver sensing rebooting of the computer system and setting the authentication mode of the authentication mode information; and
a second driver, which reads the authentication mode information and if the authentication mode is a first mode, performs rebooting without user authentication and if the authentication mode is a second mode, performs rebooting after user authentication.

2. The computer system of claim 1, wherein the first driver comprises an operating system driver.

3. The computer system of claim 1, wherein the second driver comprises a basic input/output system (BIOS) driver.

4. The computer system of claim 1, wherein the second driver performs rebooting without user authentication and changes the authentication mode into the second mode.

5. The computer system of claim 1, wherein the authentication mode information further includes information about time period in which rebooting can be performed without user authentication.

6. The computer system of claim 1, further comprising an operating system setting unit storing information related to user authentication to be referred to when the first driver runs the operating system.

7. The computer system of claim 6, wherein, when the first driver senses rebooting, the first driver changes the information related to user authentication of the operating system setting unit so as to run the operating system without user authentication.

8. The computer system of claim 7, wherein, when rebooting, the first driver reads authentication mode information from the authentication mode information storage unit and runs the operating system without user authentication when the authentication mode is the first mode.

9. The computer system of claim 8, wherein the first driver changes the authentication mode of the authentication mode storage unit into the second mode before the computer system is finished for rebooting.

10. The computer system of claim 8, wherein the first driver changes the information related to user authentication so as to perform user authentication in next booting after the operating system is run.

11. The computer system of claim 1, wherein the authentication mode information storage unit comprises a complementary metal oxide semiconductor (CMOS).

12. A method for rebooting a computer system, the method comprising:
sensing rebooting of the computer system and setting an authentication mode of authentication mode information using a first driver;

storing the authentication mode information in a rebooting information storage unit and rebooting the computer system; and reading the authentication mode information and if the authentication mode is a first mode, performing rebooting without user authentication and if the authentication mode is a second mode, performing rebooting after user authentication using a second driver.

13. The method of claim 12, wherein the first driver comprises an operating system driver.

14. The method of claim 12, wherein the second driver comprises a basic input/output system (BIOS) driver.

15. The method of claim 12, further comprising changing the authentication mode into the second mode after performing rebooting without user authentication.

16. The method of claim 12, wherein the authentication mode information further includes information about time period in which rebooting can be performed without user authentication.

17. The method of claim 16, further comprising performing rebooting after user authentication, if the time in which rebooting can be performed has elapsed.

18. The method of claim 12, wherein the authentication mode of the authentication mode information is set by the first driver of the computer system.

19. The method of claim 18, further comprising:

sensing the rebooting and changing information related to user authentication to be referred to when the first driver runs an operating system; and when rebooting, reading the authentication mode information using the first driver and when the authentication mode information is the first mode or the rebooting result of the authentication mode is successful, driving the operating system without user authentication according to the changed information related to user authentication, using the first driver.

20. The method of claim 19, further comprises further changing the information related to user authentication so that the first driver performs user authentication when booting is next performed after the operating system is run.

21. The method of claim 12, wherein the rebooting information storage unit comprises a complementary metal oxide semiconductor (CMOS).

22. A method comprising:

determining whether or not a booting mode of a computer system is a rebooting mode; and deactivating a user authentication operation if the booting mode is the rebooting mode.

23. The method of claim 22, wherein the user authentication operation is performed by a BIOS.

24. The method of claim 22, wherein the user authentication operation is performed by an operating system.

25. The method of claim 22, further comprising:

determining whether a time limit for responding has been exceeded, wherein said deactivating operation is dependent on the time limit not being exceeded.

26. The method of claim 22, further comprising determining whether at least a portion of the booting mode is successful, wherein said deactivating operation is dependent on at least a portion of the booting mode being successful.

27. A computer readable storage controlling a computer according to a method, the method comprising:

sensing rebooting of the computer system and setting an authentication mode of authentication mode information using a first driver;

storing the authentication mode information in a rebooting information storage unit and rebooting the computer system; and reading the authentication mode information and if the authentication mode is a first mode, performing rebooting without user authentication and if the authentication mode is a second mode, performing rebooting after user authentication using a second driver.

* * * * *

UNITED STATES PATENT AND TRADEMARK OFFICE
CERTIFICATE OF CORRECTION

PATENT NO. : 7,657,732 B2  Page 1 of 1
APPLICATION NO. : 11/165243
DATED : February 2, 2010
INVENTOR(S) : Kyu-in Han It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1258 days.

Signed and Sealed this

Thirtieth Day of November, 2010

David J. Kappos
*Director of the United States Patent and Trademark Office*